Aug. 17, 1954   A. L. LUCE, JR   2,686,435
REMOTE GEARSHIFT CONTROL ADAPTER
Filed March 19, 1953   2 Sheets-Sheet 1
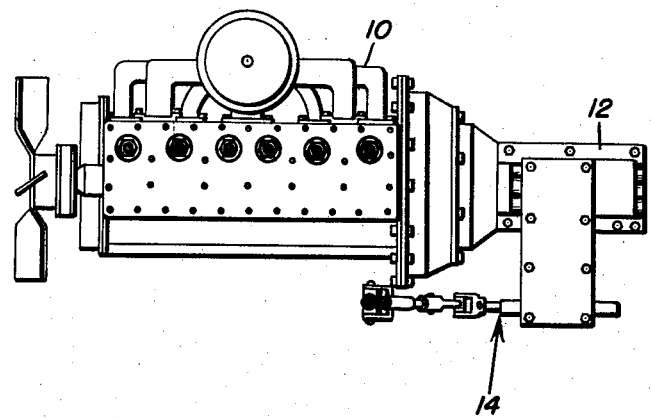
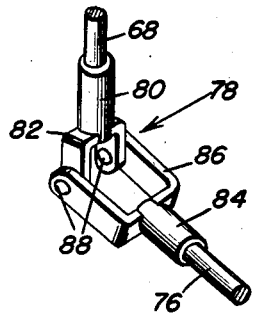
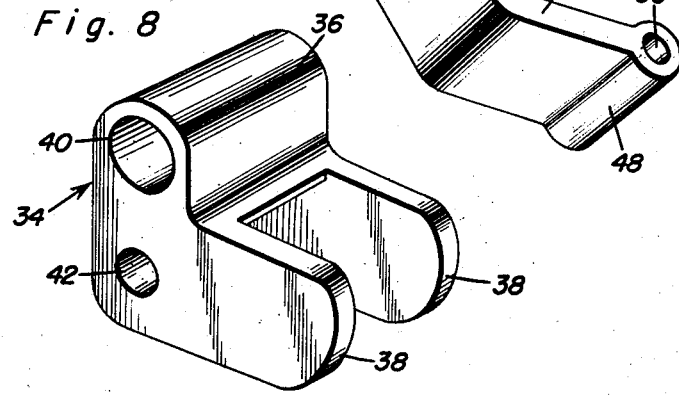
Albert L. Luce, Jr.
INVENTOR.

Aug. 17, 1954 — A. L. LUCE, JR — 2,686,435
REMOTE GEARSHIFT CONTROL ADAPTER
Filed March 19, 1953 — 2 Sheets-Sheet 2

Albert L. Luce, Jr.
INVENTOR.

Patented Aug. 17, 1954

2,686,435

UNITED STATES PATENT OFFICE 2,686,435

REMOTE GEARSHIFT CONTROL ADAPTER

Albert L. Luce, Jr., Fort Valley, Ga.

Application March 19, 1953, Serial No. 343,371

2 Claims. (Cl. 74—473)

This invention relates to gearshifting mechanism, and more specifically to a remote gearshift control adapter. At the present time there is being produced a large number of commercial vehicles of the cab over engine type wherein the driver of such a vehicle sits alongside the engine with the transmission of the vehicle being disposed rearwardly of him. Inasmuch as the transmission is disposed rearwardly of the driver, if the gearshift lever were extended directly upwardly from the transmission, the same would be inconveniently positioned. Therefore, it is the primary object of this invention to provide an improved remote gearshift control adapter which may be conveniently attached to existing transmissions whereby the gearshift lever thereof may be displaced forwardly of the transmission so as to be alongside the driver of an associated vehicle.

Another object of this invention is to provide an improved connection between a shaft and a crank arm whereby said crank arm may be moved in the desired manner upon actuation of the shaft to actuating shifting rails of a transmission.

A further object of this invention is to provide an improved remote gearshift control adapter which includes a special cover for a transmission and a special mounting for a gearshift lever, said gearshift lever being connected to the cover by elongated linkage, said linkage permitting actuation of an associated transmission upon movement of the gearshift lever.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of an internal combustion engine having associated therewith a transmission which has connected thereto the remote gearshift control adapter, which is the subject of this invention, the engine and transmission being viewed from a plane directly beneath floor boards of a vehicle and portions of the gearshift lever being shown in cross section;

Figure 6 is an enlarged fragmentary perspective view of a pivotal connection of the linkage and shows the general construction of the same;

Figure 7 is an enlarged rotated bottom perspective view of the crank arm and shows the general outline of the same; and Figure 8 is an enlarged perspective view of a bifurcated fitting carried by the shaft and connecting the crank arm thereto.

Figure 3:
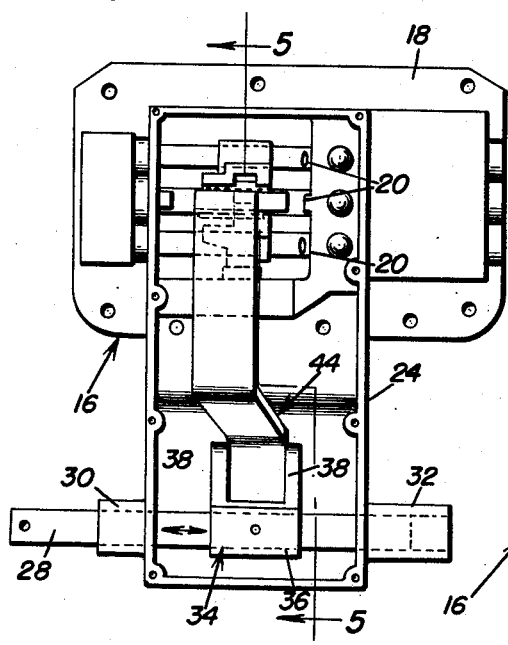
Figure 3 is a top plan view of an improved cover for a four speed transmission and shows the relationship of an actuating shaft and a crank arm relative to shifting levers thereof.
Figure 4:
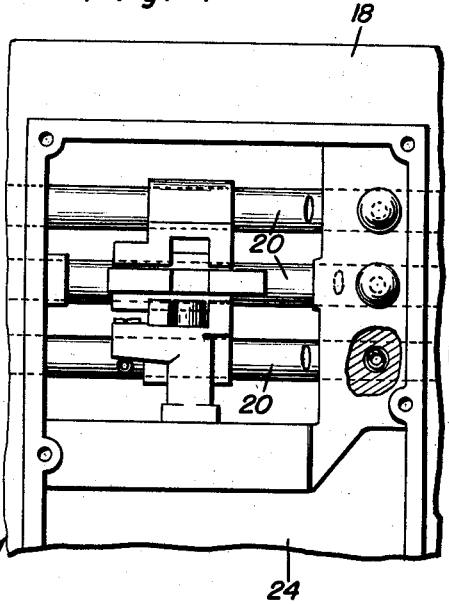
Figure 4 is an enlarged fragmentary plan view of the improved cover of Figure 3 and shows the relationship of the shifting rails mounted therein.
Figure 5:
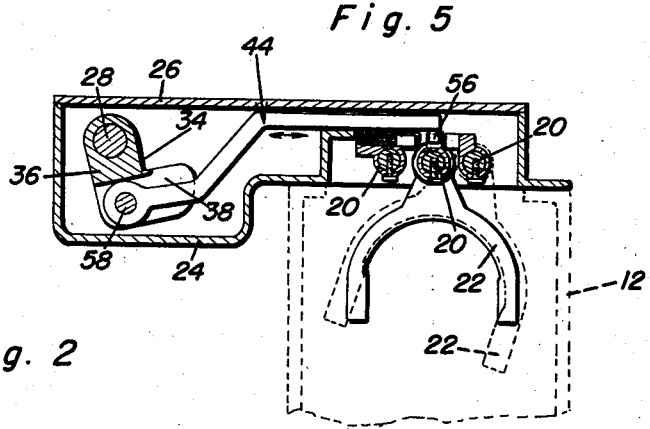
Figure 5 is a vertical sectional view taken substantially on the plane indicated by the section line 5—5 of Figure 3 and shows the general relationship of the shaft and the crank arm.
Figure 2:
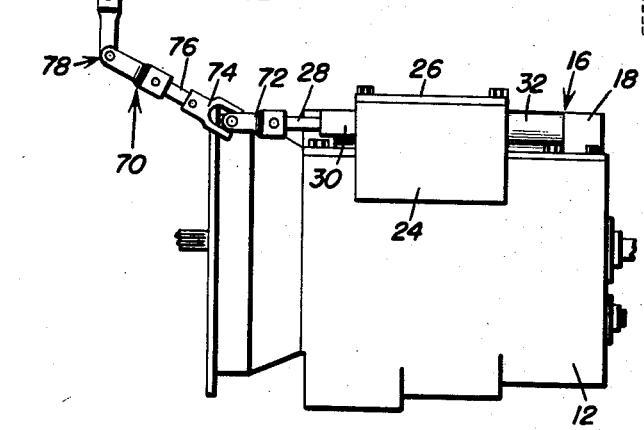
Figure 2 is an enlarged side elevational view of the transmission and gearshift control adapter of Figure 1, the engine being omitted.

Referring now to the drawings in detail, it will be seen that there is illustrated an engine 10 of a cab over engine vehicle (not shown) which has associated therewith a four speed transmission 12, the engine 10 and the transmission 12 being conventional. Secured to the transmission 12 for actuating the same is the remote gearshift control adapter which is the subject of this invention, the adapter being referred to in general by the reference numeral 14.

The adapter 14 includes a cover construction for the transmission 12, the cover construction being referred to in general by the reference 16. The cover construction 16 includes a cover 18 securable directly to the transmission 12. Mounted in the cover 18 are shifting rails 20 of the transmission 12 which are connected by suitable yokes 22 to gears (not shown) of the transmission 12. It will be understood that the shifting rails 20 and the yokes 22 are identical with those of a conventional transmission.

The cover assembly 16 also includes a housing 24 which extends transversely of the cover 18 and projects to one side thereof. The housing 24 includes a removable cover 26.

Disposed in the other end of the housing 24 and extending transversely thereof is an elongated control shaft 28. The control shaft 28 is journaled in hubs 30 and 32 which extend longitudinally from opposite sides of the housing 24.

Rigidly secured to the control shaft 28 and disposed within the housing 24 for rotation therewith is a bifurcated fitting 34.

The bifurcated fitting 34 is generally L-shaped in elevation and includes a hub 36 having a pair of spaced parallel legs 38 depending therefrom, the legs 38 projecting inwardly from the hub 36. The upper portion of the hub 36 is provided with a bore 40 through which the control shaft 28 extends. Disposed vertically below the bore 40 is a pair of aligned bores 42 in the legs 38.

Disposed within the housing 24 is an elongated crank arm referred to in general by the reference numeral 44. The crank arm includes an outer portion 46 which terminates in an enlarged end portion 48. The end portion 48 is provided with a bore 50 therethrough. The crank arm 44 also includes an inner portion 52 which is offset both vertically and transversely relative to the outer portion 46 by a sloping intermediate portion 54. Disposed adjacent the inner end of the inner portion 52 is a depending finger 56 which is engaged with the shifting rails 20 of the transmission 12.

It will be noted that the enlarged outer end portion 48 of the crank arm 44 is disposed between the legs 38 with the bore 50 aligned with the bores 42. Passing through the aligned bores 42 and 50 and pivotally connecting the crank arm 44 to the fitting 34 is a longitudinally extending pivot pin 58.

It will be noted that when the shaft 28 is rotated, the finger 56 of the crank arm 44 is moved transversely of the transmission 12 due to the actuation of the fittings 34. This selectively engages the finger 56 with a desired one of the shifting rails 20. The control shaft 28 is also mounted for longitudinal movement and such movement is imparted directly to the crank arm 44 with the resultant engagement of a desired gear.

In order that the control shaft 28 may be actuated from a remote point, there is provided a mounting plate 60 which is secured to the upper surface of a floor board 62 adjacent an associated driver's seat (not shown). The mounting plate 60 includes a socket 64 in which is mounted a ball 66 carried by a gearshift lever 68 intermediate its ends. Connecting the gearshift lever 68 to the control shaft 28 is linkage which is referred to in general by the reference numeral 70.

The linkage 70 includes a universal joint which has a first half 72 connected to the forward end of the control shaft 28. A second half 74 of the universal coupling has connected thereto a short rod 76.

Referring now to Figure 6 in particular, it will be seen that the linkage 70 also includes a pivotal connection which is referred to in general by the reference numeral 78. The pivotal connection 78 includes a first member having a sleeve portion 80 telescoped over the lower end of the gearshift lever 68. The sleeve portion 80 has secured thereto a U-shaped connecting portion 82.

The pivotal connection 78 also includes a second member which has a sleeve portion 84 telescoped over and secured to the rod 76 at the end thereof opposite from the second member of the universal coupling. The sleeve portion 84 has secured thereto a second U-shaped portion 86 which is of a slightly larger size than the U-shaped portion 82. The U-shaped portion 82 is disposed within the U-shaped portion 86 and ends thereof are pivotally connected together by pivot pins 88 which extend transversely of the longitudinal axis of the control shaft 28.

It will be seen that when it is desired to shift gears of the transmission 12 from a remote point, the gearshift lever 68 is manipulated in the normal manner. Upon manipulation of the gearshift lever 68, the control shaft 28 is either moved longitudinally or rotated due to the connection thereof to the lower end of the gearshift lever 68 by the linkage 70. Movement of the control shaft 28 results in actuation of the crank arm 44 which in turn moves selected ones of the shift rails 20 to desired positions to obtain the desired gearing of the transmission 12.

It will be understood that the gearshift lever 68 may be positioned either forwardly of the transmission 12, as shown, or rearwardly thereof by extending the control shaft 28 out of either end of the housing 24 and properly positioning the gear shift lever 68.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A remote gearshift control comprising a transmission cover having an integral housing projecting to one side thereof, a transverse shaft carried by said housing for longitudinal movement and rotation, a crank arm operably carried by said shaft within said housing, said crank arm having a finger at an end thereof opposite from said shaft for engagement with shifting rails of a transmission, a gearshift lever positioned remote from housing, linkage connecting said lever to said shaft, said crank arm being connected to said shaft by a bifurcated fitting including a pair of spaced parallel legs extending transversely of said shaft, an associated end of said crank arm being disposed between said legs and guided thereby, a pivot pin pivotally connecting said legs to said crank arm.

2. A remote gearshift control comprising a transmission cover having an integral housing projecting to one side thereof, a transverse shaft carried by said housing for longitudinal movement and rotation, a crank arm operably carried by said shaft within said housing, said crank arm having a finger at an end thereof opposite from said shaft for engagement with shifting rails of a transmission, a gearshift lever positioned remote from housing, linkage connecting said lever to said shaft, said crank arm being connected to said shaft by a bifurcated fitting including a pair of spaced parallel legs extending transversely of said shaft, an associated end of said crank arm being disposed between said legs and guided thereby, a pivot pin pivotally connecting said legs to said crank arm, said pivot pin being disposed immediately below said shaft to impart movement to said crank arm transversely of said shaft upon rotation of said shaft.

References Cited in the file of this patent

UNITED STATES PATENTS

| Number | Name | Date |
| --- | --- | --- |
| 2,180,116 | Lapsley | Nov. 14, 1939 |
| 2,252,158 | Bixby | Aug. 12, 1941 |
| 2,517,871 | Gustafson | Aug. 8, 1950 |